United States Patent
Garberg et al.

[11] Patent Number: 5,822,727
[45] Date of Patent: Oct. 13, 1998

[54] METHOD FOR AUTOMATIC SPEECH RECOGNITION IN TELEPHONY

[75] Inventors: Roger Borgan Garberg, Wilmington, Mass.; M. Yudkowsky, Chicago, Ill.

[73] Assignee: AT&T Corp, Middletown, N.J.

[21] Appl. No.: 576,740

[22] Filed: Dec. 21, 1995

Related U.S. Application Data

[63] Continuation of Ser. No. 413,330, Mar. 30, 1995, Pat. No. 5,724,481.

[51] Int. Cl.$^6$ .............................. G10L 5/04; H04M 3/42; H04M 1/66
[52] U.S. Cl. .............................. 701/243; 379/67; 379/88; 704/251
[58] Field of Search .................... 395/2.52, 2.55, 395/2.6, 2.61, 2.79, 2.84; 379/59, 67, 88, 89

[56] References Cited

U.S. PATENT DOCUMENTS

| | | | |
|---|---|---|---|
| 5,125,022 | 6/1992 | Hunt et al. | 379/88 |
| 5,127,043 | 6/1992 | Hunt et al. | 379/88 |
| 5,165,095 | 11/1992 | Borcherding | 379/88 |
| 5,181,238 | 1/1993 | Medamana et al. | 379/95 |
| 5,212,730 | 5/1993 | Wheatley et al. | 395/2.55 |
| 5,276,731 | 1/1994 | Arbel et al. | 379/88 |
| 5,282,243 | 1/1994 | Dabbaghi et al. | 379/201 |
| 5,287,403 | 2/1994 | Atkins et al. | 379/144 |
| 5,297,183 | 3/1994 | Bareis et al. | 379/59 |
| 5,301,227 | 4/1994 | Kamei et al. | 379/88 |
| 5,303,299 | 4/1994 | Hunt et al. | 379/88 |
| 5,311,594 | 5/1994 | Penzias | 380/23 |
| 5,329,608 | 7/1994 | Bocchieri et al. | 395/2.52 |
| 5,333,173 | 7/1994 | Seazholtz et al. | 379/45 |
| 5,361,295 | 11/1994 | Solomon et al. | 379/67 |
| 5,367,609 | 11/1994 | Hopper et al. | 395/2.87 |
| 5,436,957 | 7/1995 | McConnell | 379/88 |
| 5,479,489 | 12/1995 | O'Brien | 379/67 |
| 5,517,558 | 5/1996 | Scalk | 379/88 |

*Primary Examiner*—David R. Hudspeth
*Assistant Examiner*—Patrick N. Edouard

[57] ABSTRACT

Disclosed is a method and system for utilizing supplemental data to enable a voice-driven telecommunication services system to build a speech recognition template data base. Such supplemental data includes textual name data associated with many or all of a telecommunication subscriber's incoming and outgoing calls. The textual name data, which typically represents the calling or called party's name, is used to generate a speech recognition template using text-to-speech methods. The number and the speech recognition template may then be recorded in a data base to facilitate voice-driven services in connection with that party. A method according to the present invention includes obtaining a first input, where the first input identifies an aspect of a telecommunication network user. The first input may, for example, be the telephone number of the telecommunication network user. Then, supplemental information that is related to the first input in a supplemental data base is identified and retrieved from the supplemental data base. The supplemental information may, for example, be the textual name data associated with the telecommunication network user. This supplemental information is then utilized to create a speech recognition template. The speech recognition template may thereafter be used to recognize a second input, said second input comprising a spoken utterance and containing information representative of the supplemental information.

32 Claims, 6 Drawing Sheets

METHOD FOR AUTOMATIC SPEECH RECOGNITION IN TELEPHONY

CROSS REFERENCE TO RELATED APPLICATION

This is a continuation of application Ser. No. 08/413,330 filed on Mar. 30, 1995 (now U.S. Pat. No. 5,724,481).

FIELD OF THE INVENTION

The present invention relates to automatic speech recognition. More particularly, the invention relates to the provision of enhanced telecommunication services in conjunction with an automatic speech recognition (ASR) system.

BACKGROUND OF THE INVENTION

For many applications, it is advantageous to use computers to automate repetitive tasks so that the tasks may be performed more quickly and efficiently. Speech recognition, a type of voice technology, allows people to interact with computers using spoken words. Speech recognition is challenging, however, because of the inherent variations of speech characteristics and patterns among different people.

One application of speech recognition is in a telephone network. Using automatic speech recognition (ASR) systems, people can utilize various telephone services or functions without pressing pushbutton codes and without operator intervention. For example, speech recognition may be used for dialing so that the telephone user need not remember, look up, or ask for a telephone number. The ability to use speech instead of physical manipulation of a user interface has kept the demand for ASR technology high as advances in telecommunications continue. Generally, there are two types of ASR systems used in telecommunications: speaker dependent and speaker independent.

One common implementation of a speaker dependent automatic speech recognition system uses a computer which is "trained" by a particular speaker to respond to the speaker's speech patterns. The training process comprises uttering a sound (e.g., a word) to generate an analog speech input, conversion of the speech input into signal data, generation of a template representing the sound, and storage of the indexed template to appropriate specific response data, such as a computer instruction to instigate an action.

During real time operations, the words spoken by the speaker are digitized and compared to the set of speaker dependent speech recognition templates in the ASR system so that a match between the spoken words and a template can trigger a particular response by the computer. Speaker dependent ASR systems are used primarily where the training process can be justified, e.g., where the same individuals access the system on many occasions.

For applications in which no individual training can be justified, a speaker independent ASR system is typically used. A common implementation of a speaker independent ASR system uses a computer to store a composite template or cluster of templates that represent portions of words spoken by a number of different people. These templates of portions of words are also referred to as subwords. The templates are derived from numerous data samples (i.e., words spoken by a plurality of speakers) which represent a wide range of pronunciations and variations in speech characteristics. Speaker independent speech recognition systems can interact with a wide variety of people without speaker-specific training.

One popular realm in which speech recognition is employed is in the provision of voice-driven telecommunication services. One example of a voice-driven telecommunication service is the voice-dialing feature, discussed briefly above. In voice-dialing, the subscriber may initiate an outgoing call to another party by merely speaking a key word identifying the party to be called. For example, if a subscriber wishes to call a party named Johnson, the subscriber may simply speak the word "Johnson" into the telephone. In such a case, the voice-driven services device, typically located in either the subscriber's telephone or at a network service provider location, would perform speech recognition to recognize the key word to generate a dialing signal appropriate for Johnson's telephone number. Voice-dialing eliminates the need for manually dialing as well as remembering telephone numbers.

In addition to voice-dialing, other voice-driven telecommunication services are offered that rely on a command and a key word. The command identifies an action to be performed and the key word identifies the party associated with the command to be performed. For example, conference calling is a method in which the subscriber adds or conferences additional parties into an existing telephone conversation. In voice-driven conference calling, the subscriber need only recite the conference command and the name of the party to be added. For example, suppose the subscriber is currently maintaining a call with Johnson and wishes to add or conference another party Perez into the telephone call. Using voice-driven conference calling, the subscriber may issue the verbal command "conference". The voice-driven services system would then respond with the audible prompt "conference who?", to which the subscriber would respond "Perez". The communication services system would then dial Perez's telephone number and if Perez answers, add Perez to the call. Voice-driven communication services such as those discussed above are commercially available. For example, the Wildfire® System available from Wildfire Associates, Lexington Mass., provides several such voice-driven services.

A drawback associated with such systems is the method by which they obtain the necessary speech recognition templates to perform such services. Voice-driven services require access to a collection of the speech recognition templates that correspond to the parties with whom the subscriber communicates. This collection of templates is typically embodied by a data base that associates the speech recognition template of each party's name with the party's telephone number. Thus, for example, a voice-dialing device would process a voice command such as "Perez" by recognizing the name "Perez" and looking up the telephone number associated with the speech recognition template or templates representative of Perez's name. Accordingly, voice-driven service systems must maintain a data base that includes a list of numbers frequently called by the subscriber and the speech recognition template of the key word or name associated with each number.

In typical prior art systems, such data base information is provided by the subscriber through complex speaker dependent training procedures. To build a data base entry, or record, corresponding to a particular party, the subscriber typically pronounces the key word or name, for example, "Johnson" or "Perez", several times to allow the ASR system to build a speech recognition template, or subword transcription, associated with the name. The subscriber then enters the telephone number which is to be associated with the key word or name. Such procedures are not only time-consuming, but also limit the subscriber to using the voice-driven services in connection with persons whom the subscriber has already "entered" into the data base.

Moreover, the resulting templates are speaker dependent templates, or in other words, templates that depend upon the subscriber's speech characteristics. As a result, subsequent attempts at recognizing speech from other speakers may lead to errors.

Accordingly, there is a need for a more convenient and thorough process for building a data base of subword transcriptions and associated telephone numbers, and more particularly, for a process of building a data base using speaker independent templates.

SUMMARY OF THE INVENTION

This need is addressed and a technical advance is achieved in the art by a method and system for utilizing supplemental data to enable a voice-driven services system to quickly and easily build a speech recognition template data base. Such supplemental data includes textual name data associated with many or all of the subscriber's incoming and outgoing calls. The textual name data, which typically represents the calling or called party's name, is used to generate a speech recognition template using text-to-speech methods. The number and the speech recognition template may then be recorded in a data base to facilitate voice-driven services in connection with that party.

In particular, a method according to the present invention includes obtaining a first input, where the first input identifies an aspect of a telecommunication network user. Then supplemental information that is related to the first input in a supplemental data base is identified and retrieved from the supplemental data base. This supplemental information is then utilized to create a speech recognition template. The speech recognition template may thereafter be used to recognize a second input, said second input comprising a spoken utterance and containing information representative of the supplemental information.

During real time applications of an exemplary embodiment, a subscriber telephone call is routed through an enhanced voice-driven services system in accordance with the present invention. Based upon the telephone number provided by either the caller or through automatic line identification features, the system accesses a supplemental data base (e.g., a reverse directory look-up) to retrieve the textual name data associated with the telephone number. The textual name data is then processed by a text-to-speech system to generate a speech recognition template. The speech recognition template is then stored in a subscriber-specific data base. The subscriber may thereafter invoke voice-driven commands to call or otherwise invoke a voice-driven service with respect to the party by speaking a command in conjunction with the party's name. The services system employs a speech recognizer to recognize the party's name as spoken by the subscriber using the data base information.

The above described features and advantages, as well as other features and advantages, will become readily apparent to those of ordinary skill in the art by reference to the following detailed description and the accompanying drawings.

DETAILED DESCRIPTION

Figure 1:
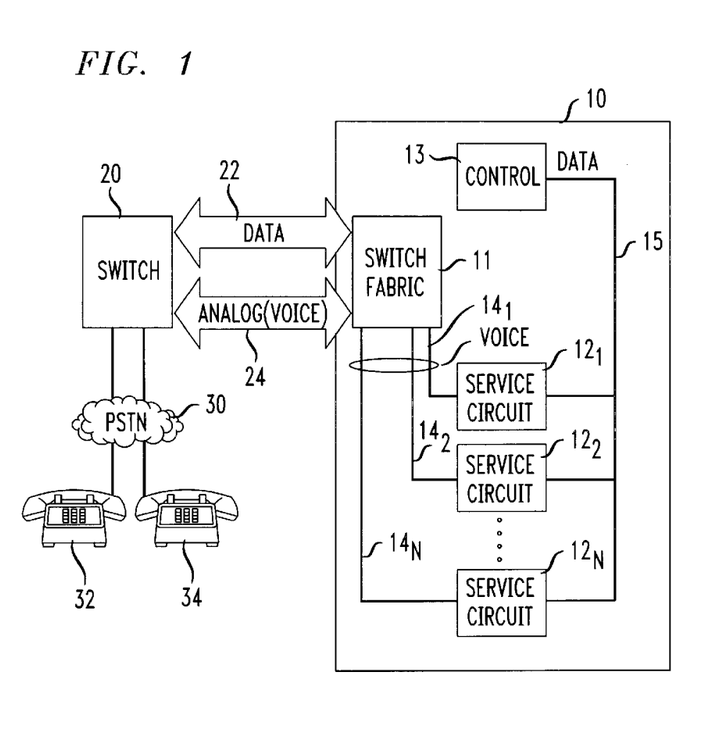
FIG. 1 illustrates a communication network including a network services system, an external switch, and a public switched telephone network.

FIG. 1 shows a communication network including a network services system 10, an external switch 20, and a public switched telephone network ("PSTN") 30. The PSTN 30 is connected to a plurality of subscriber sets, exemplified by the subscriber sets 32 and 34. The enhanced voice-driven services according to the present invention are provided generally through the network services system 10, which is maintained by the service provider and is discussed below.

In general, the external switch 20 is a distributed control, local digital switch, such as a 5ESS® Switch as described in the AT&T Technical Journal, Vol. 64, No. 6, July–August 1985, pages 1303–1564, the November 1981, *Bell Laboratories Record*, page 258, and the December, 1981, *Bell Laboratories Record*, page 290, and manufactured by AT&T. Alternatively, the external switch may suitably be another digital switch product such as the model DMS-100 available from Northern Telecom. The network services system 10 includes a switching fabric 11 which is connected to the external switch 20 via a data trunk 22 and an analog or voice trunk 24. The voice trunk 24 is operable to provide a plurality of analog voice channels, for example, 250 channels. The data trunk 22 connects to a control data interface of the external switch 20, which may, for example, be the PROXY interface of a 5ESS® Switch switching system. A similar interface exists on the Northern Telecom DMS-100.

The switching fabric 11 is a digital switching fabric operably connected to the plurality of voice channels on the voice trunk 24 and is further connected to the data trunk 22. In addition to the switching fabric 11, the network services system 10 further comprises a plurality of N service circuits $12_1 \ldots 12_N$ and a controller 13. The service circuits $12_1 \ldots 12_N$ are circuits operating to provide one or more extended services to subscribers of the communication system in FIG. 1, and are described in further detail below in connection with FIG. 2. The controller 13 may comprise a computer, as in this embodiment, and provides overall control of the operations of the network services system 10.

The switching fabric 11 is connected to the N service circuits $12_1 \ldots 12_N$ through a corresponding plurality of voice lines $14_1 \ldots 14_N$. The switching fabric 11, each of the service circuits $12_1 \ldots 12_N$, and controller 13 are interconnected for the purposes of data communication, via a Local Area Network ("LAN") 15.

Figure 2:
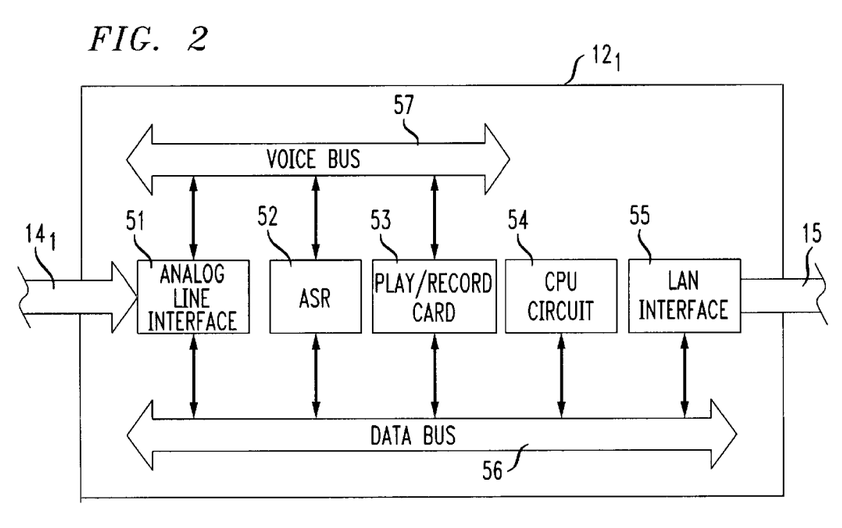
FIG. 2 illustrates an exemplary service circuit that provides voice-driven telecommunication services in accordance with the present invention.

FIG. 2 shows an exemplary service circuit $12_1$ for use in the network services system 10 of FIG. 1. While only the service circuit $12_1$ is shown in detail, the other service circuits $12_2 \ldots 12_N$ preferably have the same or a similar structure and operate in a similar manner. The service circuit $12_1$ includes an analog line interface 51, an ASR circuit 52, a play/record circuit 53, a CPU circuit 54, and a LAN interface 55, all of which are interconnected to communicate data over a data bus 56. The analog line interface 51, the ASR circuit 52 and the play/record card 53 are further connected via a voice bus 57 to communicate voice signals.

The analog line interface 51 serves as an interface between the voice line $14_1$ and the voice bus 57. All voice communication operations carried on within the service circuit $12_1$ exchange voice signals with external circuitry through the analog line interface 51. The analog line interface 51 may suitably be a model LSI 120 card available from Dialogic. The ASR circuit 52 is an automatic speech recognition circuit that performs the speech recognition functions as necessary to carry out the enhanced, voice-driven communication services, discussed further below. The structure and operation of the ASR circuit 52 are described in further detail below in connection with FIG. 3. The play/record circuit 53 is a circuit that both plays prerecorded or automated messages and records incoming voice messages. The play/record circuit 53 may suitably be a model D/8x card available from Dialogic. The LAN interface 55 is operable to provide a data interface between the LAN 15 of FIG. 1 and the data bus 56 of the service circuit $12_1$. The LAN interface 55 may suitably be a commercially available Ethernet interface.

The CPU circuit 54 includes a CPU, a volatile memory such as random access memory, and one or more disk drives or other similar storage devices. The CPU may suitably include an Intel 80486 microprocessor, although other processors may readily be used. In general, the CPU in the CPU circuit 54 executes a program loaded in to volatile memory either from the disk drive, or from the control computer 13 of FIG. 1. The CPU executes, for example, a program that includes the operations described below in connection with FIGS. 3A, 4, 5 and 6 which control the service circuit $12_1$ in order to provide enhanced, voice-driven communication services according to the present invention. The CPU circuit 54 may suitably be a model CAT1010 CPU card available from Dialogic.

Figure 3:
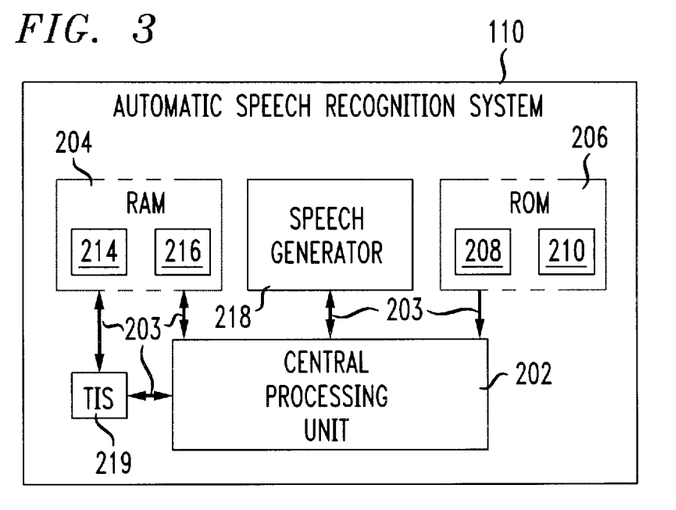
FIG. 3 illustrates a block diagram of an exemplary embodiment of an ASR circuit that comprises a portion of the service circuit illustrated in FIG. 2.

FIG. 3 shows a simplified block diagram of an exemplary embodiment of ASR circuit 52 as shown in FIG. 1. ASR system 110, which is capable of either speaker independent or speaker dependent speech recognition, includes a CPU 202 for controlling the overall operation of the system. The CPU 202 has a plurality of data buses represented generally by reference numeral 203. Also shown is a random access memory (RAM) 204, a read only memory (ROM) 206, a speech generator unit 218 for issuing greetings and prompts not otherwise provided by the play/record circuit 53. Finally, a text-to-speech (TTS) system 219 is provided (which communicates with CPU 202 and RAM 204) for transcribing written text into a subword transcription, as is known in the art.

The RAM 204 is connected to the CPU 202 by the bus 203 and provides temporary storage of speech data, such as speech signals provided over the voice bus 57 of FIG. 2. The RAM 204 further provides temporary storage of speech recognition templates, and more specifically, speaker dependent templates 214 and speaker independent templates 216. ROM 206, also connected to CPU 202 by an internal data bus 203, provides permanent storage of speech recognition and verification data including speech recognition algorithm 208 and models of subwords 210. In this exemplary embodiment, a subword-based speech recognition algorithm 208 is utilized, although many other useful approaches to speech recognition are known in the art.

A subword is a term of art which refers to one of a set of small units of speech that can be combined with other such units to form larger speech segments, e.g., words. For example, the phonetic segments of the spoken word "operator" may be represented by a combination of subwords such as "aa", "p", "axr", "ey", "dx" and "axr". Models of subwords 210 are compiled using speech recognition class data which is derived from the utterances of a sample of speakers in a prior off-line process. During the off-line process words selected so as to represent all subwords of the language are spoken by a large number of training speakers (e.g., 1000). The utterances are processed by a trained individual who generates a written text of the content of the utterances.

The models of subwords 210 represent a distribution of characteristics of a spoken word across a large population of speakers. The models 210 can be used for a ubiquitous access to an ASR system which serves the same speaker population represented by the training speakers (i.e., native-born Americans, Castillion Spanish-speaking populations, etc.).

Speaker independent template 216 is a list of subwords, or subword transcription, which represent an expected utterance or phrase. A speaker independent template 216 is created by processing written text through the TTS system 219 to generate a subword transcription which exemplify the expected pronunciations of the written word or phrase. In general, multiple templates are stored in RAM memory 204 to be available to speech recognition algorithm 208. The task of algorithm 208 is to choose which template most closely matches the subwords in a spoken utterance. Speaker dependent templates 214 are generated by having a speaker provide an utterance of a word or phrase in a process known as speaker dependent training.

During real time speech recognition operations, an utterance is processed by speech recognition algorithm 208 using models of subwords 210. The utterance is compared to the models of subwords 210 such that a list of subwords is generated. This list of subwords is matched against the list provided by speaker independent templates 216 and speaker dependent templates 214, using techniques as known in the art. The speech recognition algorithm 208 reports results of the match. Any of several known speech recognition algorithms of varying complexity may be used to recognize an utterance using the models of subwords 210, the speaker dependent templates 214, and the speaker independent templates 216.

The speech generator unit 218 is operable to generate a speech output signal in order to synthesize speech. In particular, the speech generator unit 218 receives a subword transcription, such as one of the speaker independent templates 216, and operates in a known manner to generate a speech output signal therefrom. The speech output signal is a signal that when amplified and provided to an audio receiver produces an audible signal corresponding to the subword transcription. The speech generator unit 218 may, for example, be used to facilitate the audible announcement of the names of parties for which a speaker independent template 216 exists.

The network services system 10 as shown in FIGS. 1, 2 and 3 is operable among other things, to provide enhanced voice-driven services. Such services include improved voice-dialing, voice-driven conferencing calling, voice-driven messaging and other services. Basic variations of such services are known and employed in prior art systems, such as the Wildfire® system, discussed above. The present invention greatly enhances such services by simplifying the process of entering speech recognition templates. The present invention eliminates the need for the subscriber to engage in the time-consuming process of training the ASR system.

The various components of FIG. 1, 2, and 3 operate generally in the following manner. It is assumed that the subscriber associated with the subscriber set 34 has subscribed to the voice-driven communication services provided by the system 10 of FIG. 1. In an exemplary operation, a telecommunication network user using the telephone subscriber set 32 generates a telephone call to a subscriber located at or near the telephone subscriber set 34. A call to the subscriber is referred to herein as an incoming call. The incoming call is routed through the PSTN 30 to the external switch 20. The external switch 20 then routes the call through the network services system 10 through the analog line 24. The switching fabric 11, under the supervision of the control computer 13, switches and routes the incoming call to a preselected service circuit $12_x$ over the line $14_x$. The call is then routed back through line $14_x$ the switching fabric 11, voice trunk 24, switch 20 and the PSTN 30 to the subscriber set 34, as is known in the art. In a preferred embodiment, all calls to and from the subscriber are routed through the same service circuit $12_x$.

During the course of the call, the service circuit $12_x$, under the supervision of the CPU 54 of FIG. 2, provides voice-driven telecommunication services according to the present invention, including voice-dialing, voice-driven conference calling, or voice-driven message review. To facilitate such services, the service circuit $12_x$ may also receive data pertaining to the call from the external switch 20. In particular, the switching fabric 11 receives such data from the switch 20 over the data trunk 22. Under the direction of the control computer 13, the switching fabric 11 routes the data to the corresponding service circuit $12_x$ via the LAN 15. In the service circuit $12_x$, the data is provided through the LAN interface 55 onto the data bus 56. Likewise, voice signals required for the voice recognition and messaging required to provide the voice-driven services are provided from the voice line $14_x$, through the analog line interface 51, and onto the voice bus 57.

Figure 4:
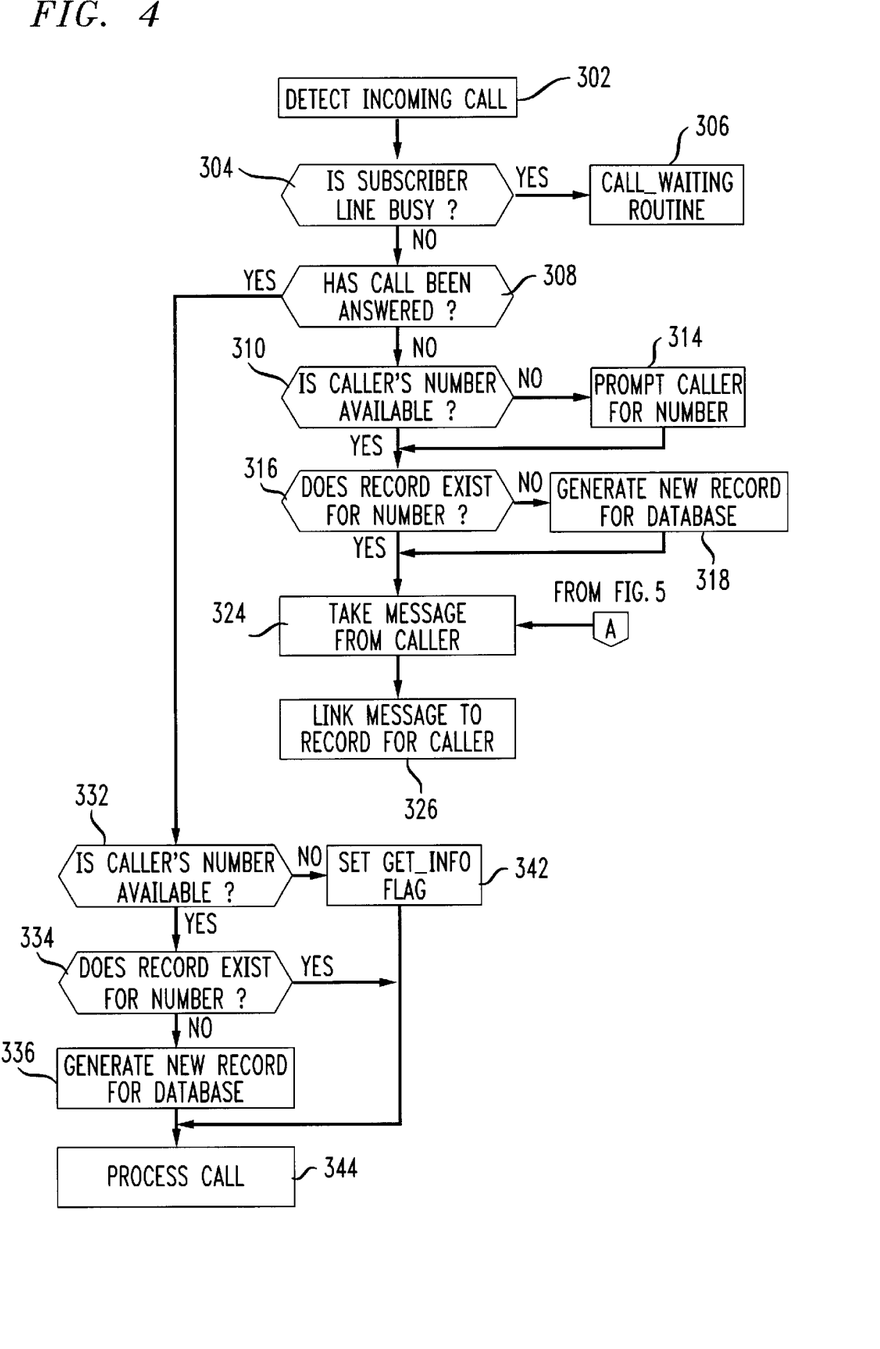
FIG. 4 illustrates the flow of operations performed by a CPU operating in accordance with the present invention in connection with incoming calls.
Figure 5:
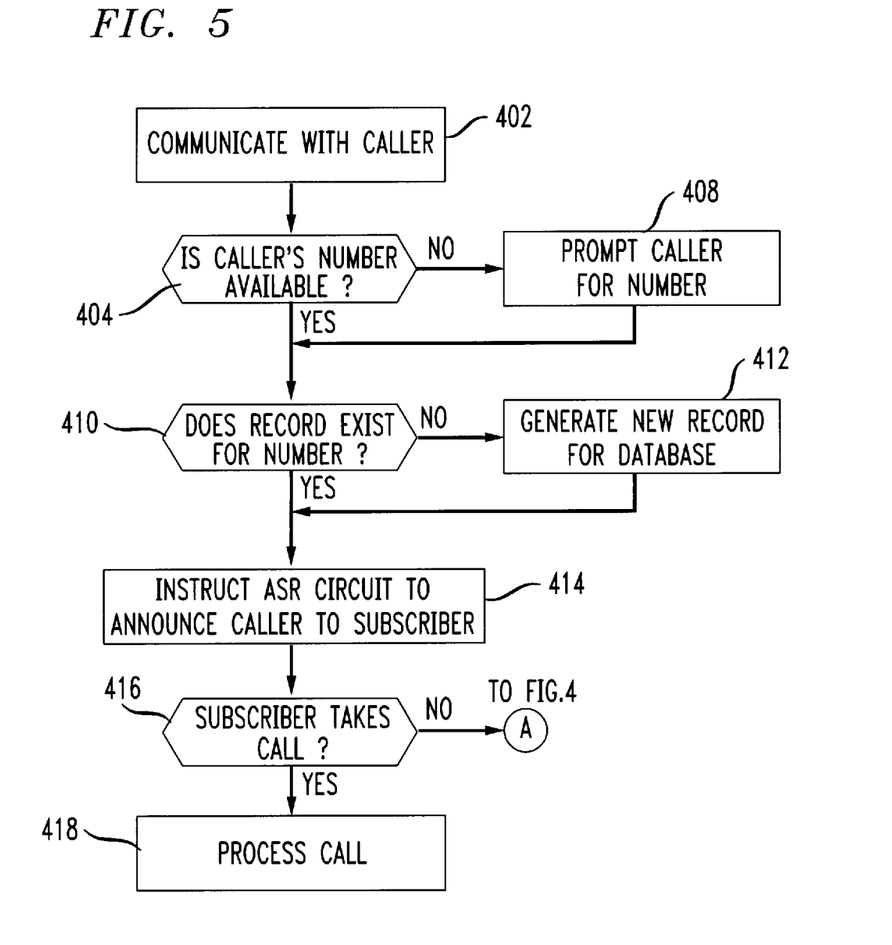
FIG. 5 illustrates an exemplary sequence of operations that a CPU operating in accordance with the present invention performs in a call waiting situation.
Figure 6:
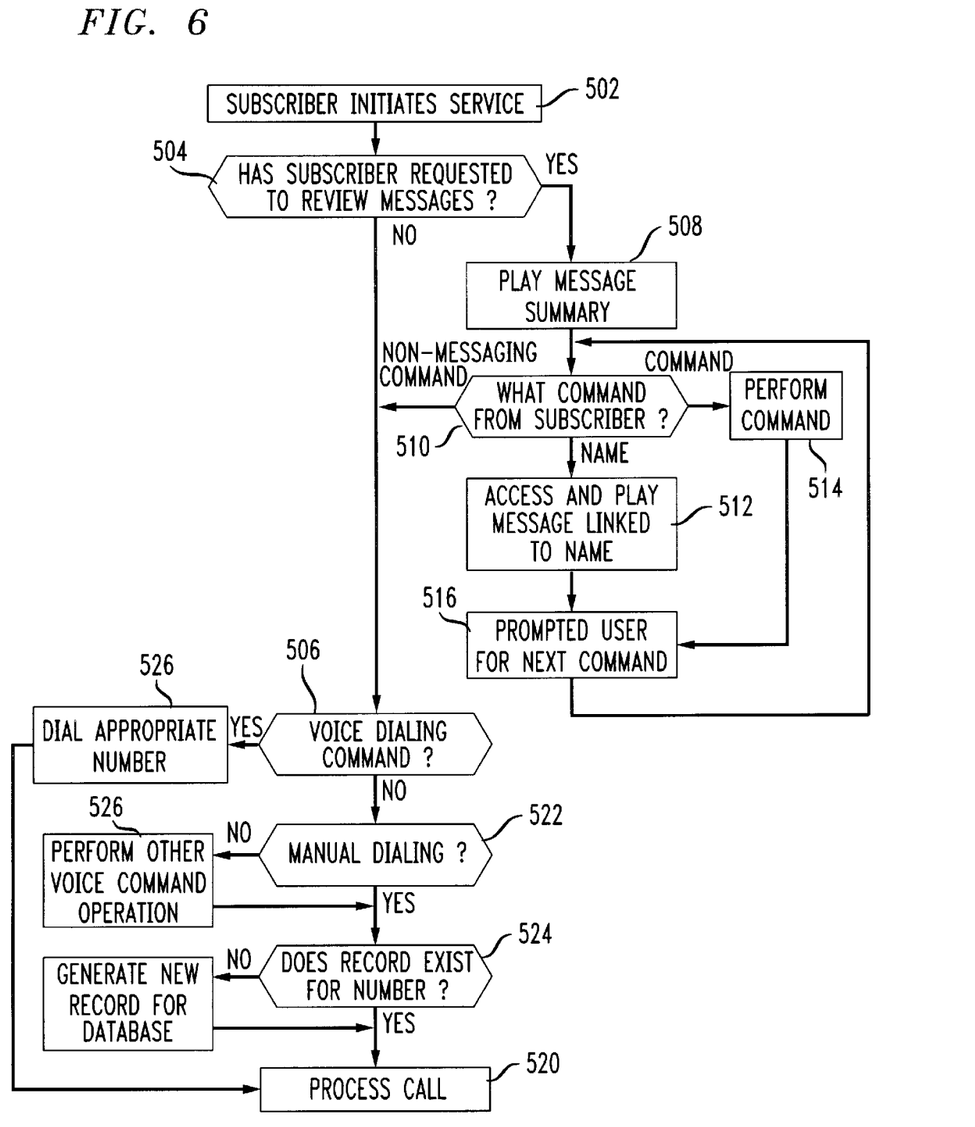
FIG. 6 illustrates an exemplary sequence of operations performed by a CPU upon activation of the service circuit originated by the subscriber in accordance with the present invention.

The CPU of the CPU circuit 54 may suitably operate in accordance with the flow diagrams illustrated in FIG. 4, 5 and 6 to provide the enhanced voice-driven services. More particularly, FIGS. 4 and 5 illustrate exemplary operations of the CPU in handling incoming calls, while FIG. 6 illustrates exemplary operations CPU in handling subscriber-initiated services. Subscriber-initiated services are voice-driven services that are activated by subscriber action, such as taking the telephone off-hook. FIGS. 4, 5 and 6 are discussed further below. Such operations are given by way of example only, and those of ordinary skill in the art may readily devise alternative procedures and operations that carry out the principals of the present invention.

In any event, an important aspect of the present invention involves the method by which the subscriber speech recognition template data base is generated and maintained. The subscriber's data base includes one or more records, with each record associated with another telecommunication network user, such as the user corresponding to the telephone subscriber set 32 of FIG. 1. Each record of the data base includes the telephone number of a particular user and a speech recognition template corresponding to the user's name. Such records are used in the course of voice-driven services to associate a spoken name with a telephone number.

Figure 3A:
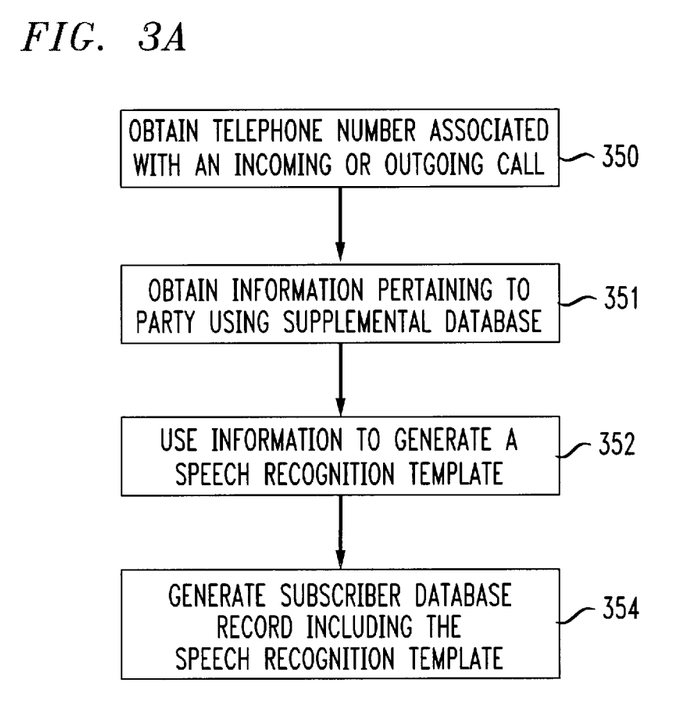
FIG. 3A illustrates a flow diagram of the operations executed by the CPU of the service circuit of FIG. 2 to generate a data base record corresponding to each incoming or outgoing call in accordance with the present invention.

According to the present invention, the CPU of the CPU circuit 54 generates such data base records automatically, without requiring complex training procedures. Preferably, the CPU automatically generates a data base record for each incoming or outgoing telephone call, if no prior record exists for the party that is associated with the call. FIG. 3A below, illustrates a flow diagram of the operations executed by the above system to generate a data base record corresponding to each incoming or outgoing call.

First, in step 350, the CPU of the CPU circuit 54 obtains a connection address, which in the present embodiment is a telephone number, for the incoming or outgoing call. If the call is outgoing, the CPU preferably obtains the called party's number from the dialed digits entered or spoken by the subscriber. As discussed above, all of the subscriber's incoming and outgoing calls are routed through the service circuit $12_x$. Consequently, the dialed digits may be obtained from the external switch 20, via the data trunk 22 of FIG. 1, the switch fabric 11, the LAN 15, the LAN interface 55 of FIG. 2 and the data bus 56. If the call is incoming, the CPU preferably obtains the calling party's number from information available from the switch 20 known as incoming caller line identification ("ICLID"), which enables services such as Caller ID. ICLID information is also available from the switch 20 via the same path. In the event that the calling party's number cannot be obtained from ICLID, then the calling party may be prompted to speak his or her telephone number. Such situations are discussed below in connection with FIG. 4.

Next, the CPU in step 351, utilizes a supplemental data base to obtain information pertaining to the party. In a preferred embodiment, the CPU performs a reverse data base look-up using the telephone number to obtain text data corresponding to the incoming caller's name, or at least the name of the person normally associated with the telephone number. In such a case, the supplemental data base would be a customer data base maintained by the PSTN service provider, or a commercially available CD-ROM data base that contain a plurality of telephone listings, such as the PhoneDisk®. If the supplemental data base is the PSTN customer data base, then the CPU may communicate with the data base through the data line 22 and the switch 20.

In an alternative embodiment, the switch 20 may provide the textual name data corresponding to a calling party directly. In such a case, steps 350 and 351 are executed by a CPU located within either the switch 20 or PSTN 30, and not the CPU of the CPU circuit 54.

In any event, in step 352, the CPU instructs the ASR circuit 52 to generate a speech recognition template of the caller's name. According to the present embodiment, the speech recognition template comprises a subword transcription of the incoming caller's first and last name. In particular, the CPU provides the text data corresponding to the caller's name to the text-to-speech (TTS) system 219 of the ASR 52, illustrated in FIG. 3. The TTS 219 then generates a subword transcription of the textual name. The ASR 52 provides the resulting subword transcription to the CPU. Thereafter, in step 354, the CPU creates a record in the subscriber's data base using the telephone number, name text data, and name subword transcription. The subscriber data base may then be used to assist the CPU in performing voice-driven services such as voice-dialing, for example.

The above described steps describe in general the operations of a CPU in a voice-driven telecommunication services system operating according to the present invention. As will become apparent, the operations discussed above in connection with of FIG. 3A may be incorporated into various specific voice-driven services that are described below in connection with FIGS. 4, 5 and 6.

FIGS. 4, 5 and 6 illustrate a flow of operations of the CPU of the CPU circuit 54 in the course of generating a subscriber data base and providing enhanced voice-driven services in accordance with the present invention. The operations are carried out by the CPU in conjunction with the other components of the network services system shown in FIGS. 1, 2 and 3. It is to be noted, however, that other configurations of the enhanced voice-driven services system having capabilities similar to those described above in connection with FIG. 1 may readily execute the operations illustrated in FIGS. 4, 5 and 6.

FIG. 4 illustrates the flow of operations performed by the CPU in connection with incoming calls, in other words, calls received by the subscriber. In general, for each incoming call, the CPU creates a data record corresponding to the caller unless a data record corresponding to that caller already exists. The data record includes the caller's name in text data, a subword transcription of the caller's name, and the caller's telephone number. In addition, the play/record circuit 53 of the services circuit $12_1$ of FIG. 2 may record a message from the caller in some situations, as discussed below. In any event, the CPU creates and retains the records as part of the subscriber data base. In this manner, the enhanced voice-driven services system is "trained" to recognize other party's names without the extensive training procedures that are required by the prior art.

In step 302, the CPU receives a signal indicating the presence of an incoming call. Then, in step 304, the CPU determines whether the subscriber line is busy, or in other words, whether the subscriber is already involved in a call. Because all subscriber calls are normally monitored by the CPU, the CPU may readily determine if the subscriber line is busy. If the subscriber line is busy, the CPU executes the call waiting procedure in step 306, which is discussed below in connection FIG. 5. If, however, it is determined that the subscriber line is not busy, then the CPU proceeds to step 308. In step 308, the CPU determines if the incoming call is answered by the subscriber. If, in step 308, the subscriber does not answer the call within a predetermined number of ringing signals, then the CPU proceeds to execute a Take_Message routine which commences at step 310. If, however, the subscriber answers the call within the predetermined number of rings, then the CPU proceeds to step 332 to process the call.

In the Take_Message routine, in step 310, the CPU determines whether the caller's telephone number is available through ICLID or otherwise. At present, such services cannot necessarily in every instance identify the telephone number of an incoming call, particularly for long distance or interlata telephone calls. If, in step 310, the caller's telephone number is available, then the CPU proceeds directly to step 316. If, however, the telephone number is not available, then the CPU first executes step 314 in which the caller is solicited for his or her telephone number. To this end, in step 314, the CPU directs the play/record circuit 53 to play a recorded announcement that prompts the caller to enter the telephone number using the telephone keypad, or by speaking the digits. If the caller communicates the number by speaking the digits, the CPU directs the ASR circuit 52 to perform speech recognition to determine the number. In any event, once the caller telephone number is retrieved, the CPU may then proceed to step 316.

In step 316, the CPU determines whether the subscriber has an existing data base record associated with the caller. Over a period of time, the subscriber's data base will contain records corresponding to several parties who have called the subscriber and whom the subscriber has called. Consequently, it is possible that a record already exists for the number associated with any particular incoming call, among others. Accordingly, in step 316, the CPU attempts to match the caller's telephone number with the telephone numbers in existing subscriber data base records.

If the CPU determines in step 316 that the subscriber data base includes an existing record associated with the caller, then the CPU proceeds directly to step 324, discussed below. If, however, the CPU determines that the subscriber data base does not include a record associated with the telephone number corresponding to the incoming call, then the CPU executes step 318. In step 318, the CPU automatically generates a data base record corresponding to the caller using the incoming caller's telephone number. Preferably, each record contains the following fields: the caller's name in text data; a subword transcription of the caller's first and last name; and the caller's telephone number. To generate the record, the CPU executes the steps 351, 352 and 354 of FIG. 3A, discussed above. Once the record is created in step 318, the CPU executes step 324.

In step 324, the CPU directs the play/record circuit 53 of FIG. 2 to prompt for and subsequently record a message from the caller. Upon completion of the message, the CPU then executes step 326 in which the recorded message is logically associated with the data base entry associated with the caller. The CPU may then end operations for that call.

In an exemplary sequence of the above-described steps, suppose Johnson calls the subscriber, who does not answer the phone within the predetermined number of rings, for example, five. The CPU obtains Johnson's number through ICLID techniques and determines that the subscriber already has a data base entry for Johnson. The CPU then prompts Johnson to leave a message. Once the message is recorded, the CPU tags or logically associates the message to the data base entry for Johnson. The reason for associating the recorded message with the data base entry is to allow retrieval of the message using speech commands, as is discussed further below.

Returning to the description of FIG. 4, the sequence of steps that begin with step 332 represent the operations performed when the subscriber answers the incoming call or in other words, the answer in step 308 is "yes". The following steps serve to obtain the required data to populate a data base record associated with the incoming caller while the call is in progress. To this end, in step 332, the CPU first determines if the telephone number of the caller is available, employing the same methods as discussed above in connection with step 310. If the caller's telephone number is available, then, in step 334, the CPU determines whether the subscriber data base includes a record associated with the caller. If so, then the CPU proceeds to normal call processing which is shown as step 344 and discussed in detail below in connection with FIG. 6.

If, however, in step 334, it is determined that the subscriber data base does not include a record associated with the caller, then the CPU executes step 336. In step 336, the CPU the CPU generates a new data base record. To this end, the CPU generates a record using the method shown in steps 351, 352 and 354, discussed above. After step 336, the CPU then proceeds to step 344 to proceed with normal call processing.

Referring again to step 332, if it is determined that the incoming caller's telephone number is not readily available through ICLID or a similar service, then the CPU sets a flag Get_Info that indicates that the CPU will elicit the name and number of the caller from the subscriber once the call has terminated. In this manner, the CPU may generate a data base record corresponding to the incoming call even though the telephone number of the incoming caller is not available. After the flag is set, the CPU executes step 344 to proceed with normal call processing. When the call is terminated, the subscriber will be prompted for the name and number of the caller and a corresponding data base record will be created. Alternatively, it may not be preferable to create a data base record in such instances in order to avoid prompting the subscriber for such information after the call has terminated. In such a case, the CPU would not set the Get-Info flag and would not create a data base record.

In any event, the method of FIG. 4 generates data base records containing speech recognition templates for all or most incoming calls regardless of whether or not the call is answered, in accordance with one aspect of the present invention. In addition, the method of FIG. 4 records messages for unanswered calls in accordance with another aspect of the present invention.

FIG. 5 illustrates a sequence of operations that the CPU performs in a call waiting procedure according to the present invention. In step 402, the CPU sets up communications directly with the incoming line. At this point, the incoming caller is not connected to the subscriber's line. It is noted that such an operation requires that the services circuit $12_x$ have access to at least two voice lines. One voice line carries the ordinary subscriber telephone call while the other voice line used by the service circuit $12_x$ to communicate with the incoming caller while the subscriber's normal line is in use.

Once communications are set up with the incoming caller in step 402, the CPU executes step 404. In step 404, the CPU determines whether the caller's number is available. As discussed above in connection with step 310, the CPU may utilize ICLID or a similar service to identify the caller's telephone number. If the telephone number is available, then the CPU proceeds directly to step 410. If, however, the telephone number is not available, then the CPU first executes step 408 in which the caller is solicited for his or her telephone number. In particular, the CPU may obtain the number by either of the methods discussed above in connection with step 314 of FIG. 4. After step 408, the CPU proceeds to step 410.

In step 410, the CPU determines whether the subscriber data base includes a record associated with the caller. If so, then in step 414, the CPU connects to the subscriber line, causing the name of the caller to be announced to the subscriber. To announce the name of the caller, the CPU directs the speech generator unit 218 of the ASR circuit 52 to generate a speech output signal using the subword transcription from the data base record associated with the caller. The speech output signal is then provided over the subscriber line to the subscriber.

If, however, in step 410, the CPU determines that the subscriber data base does not include a record corresponding to the incoming caller, then the CPU executes step 412. In step 412, the CPU automatically generates a data base record associated with the caller using the incoming caller's telephone number. The data base record generation method utilized in step 412 is shown in further detail in FIG. 3A. Once the record is generated, then the CPU proceeds to step 414 and, as discussed above, notifies the subscriber of the incoming call and announces the name retrieved for the caller.

After the caller is announced in step 414, the CPU in step 416 waits for the subscriber to determine whether the subscriber will respond to the incoming call. The subscriber may signal his or her desire to the CPU either by tapping the switch hook switch or through oral or keypad commands. If the subscriber indicates that the incoming call will not be responded to, then the CPU proceeds to take a message from the caller by returning to step 324 of FIG. 4 and proceeding accordingly. If, however, the subscriber chooses to respond to the incoming call, then the CPU in step 418 provides a command to the external switch 20 to execute the desired connection. Thereafter, the CPU may execute normal call processing functions.

Another advantage and aspect of the present invention is the capability to offer greatly enhanced answering services to the subscriber. As discussed above, the Take_Message routine performed by the CPU associates each recorded message with one of the subscriber's data base records. If an incoming caller does not have an existing data base record, then one is created for the caller. In any event, the method of the present invention provides messages that are directly connected with data identifying the subword transcription and telephone number of the person who left the message. Consequently, upon hearing the message, the user may readily use voice commands instruct the CPU to dial the number of a person who left the message, as is discussed below in connection with FIG. 6.

FIG. 6 illustrates an exemplary sequence of operations performed by the CPU when the subscriber initiates the use of services by taking the subscriber set off-hook. In particular, the subscriber typically initiates services either to make an outgoing telephone call or to retrieve messages. Accordingly, FIG. 6 illustrates both a message retrieval method operating according to the present invention as well as an out-dialing method. The operations in FIG. 6 concerning the messaging system are intended to operate in conjunction with the Take_Message routine described above in connection with FIG. 4. Accordingly, most, if not all, recorded messages are associated with a record in the subscriber data base that corresponds to the caller who left the message.

In step 502, the subscriber goes off-hook, which activates the network services system 10 including the CPU. Then, in step 504, the CPU determines whether the subscriber has requested to review stored messages, if there are any. To this end, the CPU directs the ASR circuit 52 from FIG. 2 to monitor the subscriber line for a command such as "messages" or "review messages". If the subscriber has requested to review messages, then the system notifies the subscriber of any messages using audible notification methods as is known in the art. If the user has not requested to review any messages, or if there are no messages, the CPU proceeds to step 506. Beginning with step 506, the CPU supervises the performance of an out-dialing method.

In step 506, the CPU determines whether the subscriber has involved a voice-dialing feature. The subscriber typically invokes voice-dialing by simply speaking the called party's name aloud. To this end, the CPU and ASR circuit 52 operate in a well known manner to detect an utterance representative of a name of a party to be called. If the utterance is recognized as corresponding to an existing subword transcription in the subscriber's data base, then the CPU executes step 518 to perform voice-dialing. In voice-dialing operation, the CPU retrieves the telephone number associated with the data base record containing the recognized subword transcription. Once the telephone number is retrieved, the number is dialed and the CPU performs normal cell processing in step 520. Such voice-dialing operations are known. For example, suitable voice-dialing operation that employs stored subword transcriptions to perform voice recognition and dial telephone numbers is described in U.S. Pat. No. 5,301,227, column 6, line through column 8, line 50. One of ordinary skill in the art may readily incorporate a suitable voice-dialing operation into the present invention.

If, in step 506, the CPU determines that the subscriber has not invoked the voice-dialing feature, then the subscriber has, under normal circumstances, either issued another voice command or is manually dialing a telephone number for an outgoing call. Accordingly, if the answer in step 506 is no, then the CPU proceeds to step 522.

In step 522, if the CPU determines that the subscriber is manually dialing an outgoing call, then the CPU proceeds to step 524. If not, however, or in other words, the subscriber has instead issued a voice command, the CPU proceeds to step 526 to perform the service involved by the command. For example, the subscriber may speak the command "conference", which would invoke a voice-driven conference calling service. Those of ordinary skill in the art may readily implement such services.

Referring again to step 524, upon completion of a manual dialing operation, the CPU determines whether a data base record exists that is associated with the dialed number. If so, then the CPU proceeds to step 520 to perform normal call processing operations. If not, however, then the CPU proceeds to step 528. In step 528, the CPU generates a new base record corresponding to the manually dialed telephone number. To this end, the CPU may suitably execute steps 351, 352 and 354 of FIG. 3A, discussed above. Once the new data base record is created, the CPU may then execute the normal call processing routines in step 520.

The above described method enables the subscriber to automatically generate data base records comprising the telephone number, the textual name data, and the speech recognition template for any manually dialed outgoing call. In essence, the subscriber can "train" the system merely by dialing a telephone number. This simplified training method provides a vast improvement over prior systems.

Referring again to step 504, if the CPU determines that the user has requested his or her messages, then the CPU executes step 508. In step 508, the CPU instructs the ASR circuit 52 in connection with the play record circuit 53 to play a message summary. The message summary includes a sequential listing of the names of parties that left messages since the last time the messages were reviewed. The message summary may, for example, consist of "Message from Johnson. Message from Perez. No further messages." The play/record circuit 52 provides such messages as prerecorded sequences with the exception of the names, such as Johnson and Perez. To insert the names, the ASR circuit 52 generates speech using subword transcriptions for the data base entry that is logically associated with each stored message.

Once the message summary has been provided, the CPU then determines, in step 510, whether it has received an oral instruction from the subscriber regarding one or more of the messages. To this end, the CPU works in conjunction with the ASR circuit 52 to determine if any valid oral commands are given, using speech recognition techniques to match the subscriber's utterance to stored commands or names. Exemplary valid oral commands include the recitation of the name of any caller identified in the message header, such as "Perez" or "Johnson", or another command such as "erase" or "save". Accordingly, in step 510, if the CPU determines that it received an oral command identifying a name, such as "Perez" or "Johnson", then the CPU proceeds to step 512. Alternatively, in step 510, if the CPU determines that it has received another command pertaining to the messaging service, it proceeds to step 514. Finally, if in step 510 the CPU determines that it has received a "call" command, then the CPU provides the prompt "call who?" to the subscriber and proceeds to step 506 to perform voice-dialing.

If a message retrieval has been requested by a subscriber's utterance of a party's name in step 510, then in step 512 the CPU accesses the message associated with the subword transcription recognized in the subscriber's utterance. For example, if the subscriber utters "Johnson", and "Johnson" is recognized in step 510, then the CPU accesses the message associated with the subword transcription for Johnson. Accordingly, the CPU directs the play/record circuit 53 to access and play the message from Johnson. After step 512, the CPU prompts the user for the next command in step 516. The CPU then returns to step 510 and proceeds accordingly.

If another command has been requested in step 510, then in step 514 the CPU performs the requested command as identified in the subscriber's utterance. To this end, the CPU may request more information pertaining to the given command. For example, if the command is "save", the CPU may instruct the play/record circuit 53 to ask the user "Save message from whom?" In such a case, the CPU would then recognize the name and perform the requested command with respect to the message corresponding to the recognized name. After step 514, the CPU then prompts the user for the next command in step 516. The CPU then returns to step 510 and proceeds accordingly.

It should also be noted that, alternatively, the subscriber may invoke the voice dialer by issuing a voice command such as "Call" at any time during the messaging service steps 510, 512, 514 and 516. In such a case, the CPU would then immediately return to step 506 to perform the voice-dialing function.

As can be seen above in the description of FIGS. 4, 5 and 6, the exemplary enhanced voice-driven telecommunication services system described above provides several improvements over existing systems. By retrieving a called or calling party's name text data and generating speech recognition data therefrom, the subscriber's data base of speech recognition templates may be quickly and easily populated. Generally, prior art systems relied on extensive training procedures to obtain such data. These procedures required significant subscriber involvement because each data base record required repeated subscriber utterances, as well as subscriber knowledge of the associated telephone numbers. By contrast, the method and apparatus described herein automatically populates the data base records during incoming and outgoing calls. Further, enhanced messaging and call-waiting functions as described above are facilitated by the present invention.

In an alternative embodiment of the present invention, the service circuit may operate in a manner to automatically populate a subscriber's data base using the subscriber's calling history. For example, the CPU may obtain the N telephone numbers most frequently called by the subscriber from the PSTN 30 of FIG. 1. The CPU would then generate a data base record including the speech recognition template and telephone number for each of the N most frequently called numbers. This alternative embodiment may be accomplished by replacing step 350 of FIG. 3 with a step that includes querying the PSTN 30 of FIG. 1 for the N telephone numbers most frequently called by the subscriber. Then, steps 351 through 354 would be repeated for each of the N telephone numbers. Such an embodiment would provide the subscriber with an instant data base for use by the voice-driven services. Of course, both this embodiment and the embodiment described in FIGS. 4, 5 and 6 may be combined to work together.

In another alternative embodiment, the services and functions carried out by the service circuit $12_1 \ldots 12_N$ of FIGS. 1 and 2 may readily be carried out by subscriber equipment located within or in close proximity to the subscriber's set 32. Such an embodiment is described briefly below in connection with FIG. 7.

Figure 7:
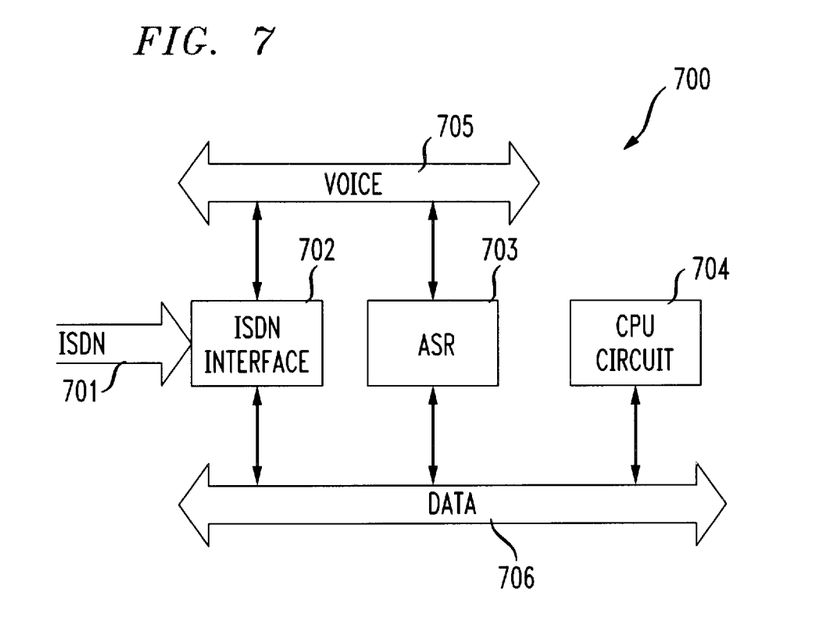
FIG. 7 illustrates a subscriber set operable to provide the enhanced, voice-driven communication services according to the present invention.

FIG. 7 shows a subscriber set 700 operable to provide the enhanced, voice-driven communication services according to the present invention. The subscriber set 700 includes an integrated services digital network ("ISDN") line 701, an ISDN line interface 702, an ASR circuit 703, a CPU circuit 704, a voice bus 705 and a data bus 706. The ISDN line connects the ISDN interface 702 with an external switch (not shown), which may suitably be the external switch 20 of FIG. 1. The ISDN line is operable to provide at least two digital voice channels and a data channel. The voice channels are preferably used for communicating voice signals while the data channel is preferably used to communicate call information data, such as ICLID information and other data available from the external switch. The ISDN interface may suitably be a model PC/ISDN CAG4 interface available from AT&T Corporation.

The data bus 716 provides a data connection between the ISDN interface 702 the ASR circuit 703 and the CPU circuit 704. The voice bus 705 provides voice signal communication to the ASR circuit 703. The CPU circuit 704 may suitably be the same circuit as the CPU circuit 54 discussed above in connection with FIG. 2. Likewise, the ASR circuit 703 may suitably be the same circuit as the ASR circuit 52 discussed above in connection with FIG. 2.

In operation, the CPU of the CPU circuit 704 and the ASR 703 operate in essentially the same manner as discussed above in connection with FIGS. 2, 3, 3A, 4, 5, and 6. In this embodiment, however, incoming and outgoing calls are not routed through the services circuit $12_x$ of FIGS. 1 and 2 for the purposes of the present invention. Instead, incoming calls are provided directly to the subscriber over the digital ISDN voice channels, and the data communication necessary to carry out the invention is transmitted over the ISDN data channel. For example, in execution of the flow diagram illustrated in FIG. 3. In step 350, the CPU of the circuit 704 preferably receives caller identification information over the data channel. In step 351, the CPU circuit 704 requests and receives information from the supplemental data base from the PSTN via the external switch and the ISDN data channel. It is further noted that the ISDN voice channels will support call conferencing and call waiting as described above as part of the enhanced voice-driven services facilitated by the present invention.

Such an embodiment is at present less favorable because it requires sophisticated customer equipment, including an ISDN line. However, once technology advances adequately to make this embodiment cost effective, it may provide a preferred alternative to locating the enhanced voice-driven communication services on the service provider's premises.

It is to be understood that the above described embodiments are merely illustrative. Those of ordinary skill in the art may readily devise other implementations that incorporate the principles of the present invention and fall within the spirit and scope thereof. For example, while the above described embodiment is intended for use in a PSTN-based telephone system, it may readily be adapted for other communication networks that support voice (and data) communication, such as the Internet. In such other networks, another kind of connection address such as a network address may be used as the input to identify the telecommunications network user (or incoming caller) instead of a telephone number. Furthermore, the speech recognition templates generated in accordance with the above-described methods may also be modified or supplemented by subsequent subscriber utterances. For example, in step 506 of FIG. 6, if the subscriber speaks a party's name for voice-dialing, the ASR circuit 52 may also use that utterance to modify the speech recognition template, or even simply add a speaker dependent speech recognition template, in the subscriber data base record corresponding to that party. Those of ordinary skill in the art may readily implement such a feature.

Furthermore, the use of a connection address to identify the telecommunication network user is given by way of example only. In an alternative embodiment, a user's credit card number or home address may be used to identify the telecommunications network user. In such systems, the supplemental data base would then correlate the credit card number or home address to textual information pertaining to the network user in order to enable a system according to the present invention to develop a speech recognition template. In fact, any input that identifies an aspect of the telecommunication network user is sufficient as long as there is a data base connecting that aspect to the textual representation of the user's name.

The invention claimed is:

1. In a system including an automatic speech recognition (ASR) system, a method of utilizing information stored in a supplemental data base to enhance a capability of the ASR system, the method comprising:

(a) obtaining a first input, said first input comprising a connection address associated with a telecommunication network user;

(b) identifying and retrieving supplemental information stored in the supplemental data base, the supplemental information comprising textual information related to the first input;

(c) creating a speech recognition templated derived from the supplemental information retrieved from the supplemental data base; and (d) using the speech recognition templated to recognize a second input, said second input comprising a spoken utterance, said second input containing information representative of the supplemental information.

2. The method of claim 1 wherein step a) further comprises obtaining incoming caller line identification information from public switched telephone network equipment corresponding to an incoming call from the telecommunications network user.

3. The method of claim 1 wherein step a) further comprises obtaining a dialed telephone number in an outgoing call to the telecommunications network user.

4. The method of claim 1 wherein step a) further comprises obtaining a spoken utterance and recognizing the spoken utterance to produce the first input.

5. The method of claim 1 wherein the supplemental information comprises textual information and step c) further comprises the step of using a text-to-speech system to generate a subword transcription of the supplemental information.

6. The method of claim 1 further comprising a step of creating a record for a subscriber data base, said record including the first input and the speech recognition template.

7. The method of claim 1 further comprising a step e) performing a communication service involving the telecommunication network user after recognizing the second input.

8. The method of claim 7 wherein step e) further comprises retrieving a recorded message generated by the telecommunications network user.

9. The method of claim 7 wherein step e) further comprises automatically dialing a telephone number associated with the telecommunications network user.

10. In a telephone network, a method of using a supplemental data base in connection with an automatic speech recognition (ASR) system to enhance the capability of the telephone network, the method comprising the steps of:

(a) receiving an incoming call from a caller;

(b) obtaining the telephone number associated with the caller;

(c) retrieving supplemental information stored in a supplemental data base using the telephone number as an index, wherein the supplemental information is textual data;

(d) creating a speech recognition template corresponding to the textual data as retrieved from the supplemental data base;

(e) storing the speech recognition template and the telephone number associated with the caller; and (f) recognizing a second utterance using a speech recognition algorithm and the speech recognition template wherein said utterance includes information identifying the caller.

11. The method of claim 10 wherein step d) further comprises using a text-to-speech system to generate a subword transcription of the supplemental information, and said subword transcription comprises the speech recognition template.

12. A voice-driven services system for use in connection with a telecommunication network, the system comprising:

a) an automatic speech recognition circuit operable to recognize an utterance by comparing the utterance to one or more speech recognition templates, said automatic speech recognition circuit including a text-to-speech system; and b) a computer processing unit coupled to the automatic speech recognition circuit and operable to obtain a first input, said first input identifying an aspect of a telecommunication network user, and the computer processing unit is further operable to retrieve textual information from a first data base related to the first input, and wherein the text-to-speech system is operable to generate a speech recognition template from the textual information.

13. The voice-driven services system of claim 12 wherein the automatic speech recognition circuit is further operable to recognize a second input, said second input comprising a spoken utterance containing information representative of the textual information.

14. The voice-driven services system of claim 12 wherein the computer processing unit is further operable to retrieve the first input wherein the first input comprises a connection address associated with the telecommunications network user.

15. The voice-driven services system of claim 14 wherein the computer processing unit is further operable to retrieve the first input wherein the first input comprises a connection address including a telephone number associated with the telecommunications network user.

16. The voice-driven services system of claim 15 wherein the computer processing unit is further operable to retrieve textual information from the first data base wherein the first data base contains information associating textual name information with telephone number information for a plurality of telecommunications network users.

17. The voice-driven services system of claim 12 wherein the computer processing unit is further operable to generate a subscriber data base record comprising the textual information and the speech recognition template.

18. The voice-driven services system of claim 17 wherein the computer processing unit is further operable to perform a plurality of voice-driven services including voice-dialing using the subscriber data base record.

19. The voice-driven services system of claim 12 wherein said automatic speech recognition circuit further comprises a speech generator, said speech generator operable to generate a speech output signal representative of the textual information.

20. The voice-driven services system of claim 19 wherein the computer processing unit is further operable to cause the speech generator to provide the speech output signal representative of the textual information to a subscriber line when the subscriber line is maintaining a telephone call.

21. A voice-driven services system for use in connection with a telecommunication network, the system comprising a) a memory containing a program for execution by a computer processing unit; and b) a central processing unit ("CPU") operably connected to the memory to execute the program therein, wherein the CPU executes the program in the memory in order to obtain a first input, said first input identifying an aspect of a telecommunication network user, retrieve supplemental data related to the first input, said supplemental data comprising textual information, direct an automatic speech recognition circuit to generate a speech recognition template from the supplemental data, and direct the automatic speech recognition circuit to recognize a second input comprising an utterance using the speech recognition template.

22. The voice-driven services system of claim 21 further comprising an automatic speech recognition system operable to generate the speech recognition template from the supplemental data and recognize the second input using the speech recognition template.

23. The voice-driven services system of claim 21 wherein the CPU is further operable to execute the program in the memory to obtain the first input in the form of a connection address of the telecommunication network user.

24. The voice-driven services system of claim 23 wherein the CPU is further operable to execute the program in the memory to perform voice-dialing services using the recognized second input.

25. The voice-driven services system of claim 23 wherein the CPU is further operable to execute the program in the memory to generate a data base record that includes the connection address of the telecommunication network user and the generated speech recognition template.

26. The voice-driven services system of claim 25 wherein the CPU is further operable to generate and maintain a data base containing a plurality of records, each record corresponding to a telecommunications network user and including a connection address associated with the telecommunication network user and a speech recognition template associated with the telecommunication network user.

27. The voice-driven services system of claim 21 further comprising a play/record circuit operably connected to telecommunication network and the CPU, said play/record circuit operable to play recorded announcements to the telecommunication network user and record utterances spoken by the telecommunications network user.

28. The voice-driven services system of claim 27 wherein the CPU is further operable to:
   direct the play/record circuit to play a recorded announcement prompting the telecommunication network user to leave a message;
   direct the play/record circuit to record an utterance from the telecommunications network user; and
   associate the recorded utterance to the speech recognition template.

29. The voice-driven services system of claim 28 wherein the CPU is further operable to direct the ASR circuit to recognize a second utterance provided by a subscriber using the speech recognition template and,
   direct the play/record circuit to play the recorded utterance from the telecommunications network user if the recognized second utterance corresponds to the speech recognition template.

30. The voice-driven services system of claim 21 wherein the CPU is further operable to execute the program in the memory in order to obtain the first input during an incoming call to a subscriber from the telecommunication network user.

31. The voice-driven services system of claim 30 wherein the CPU is further operable to execute the program in the memory to obtain the first input wherein the first input is a telephone number of the telecommunication network user.

32. The voice-driven services system of claim 31 wherein the CPU is further operable to execute the program in the memory to obtain the telephone number of the telecommunication network user using data provided from an external switch.

* * * * *